G. CONSTANTINESCO.
POWER DRIVEN RECIPROCATING IMPLEMENT AND MEANS FOR DRIVING THE SAME.
APPLICATION FILED APR. 27, 1917.
1,372,941.
Patented Mar. 29, 1921.
3 SHEETS—SHEET 1.
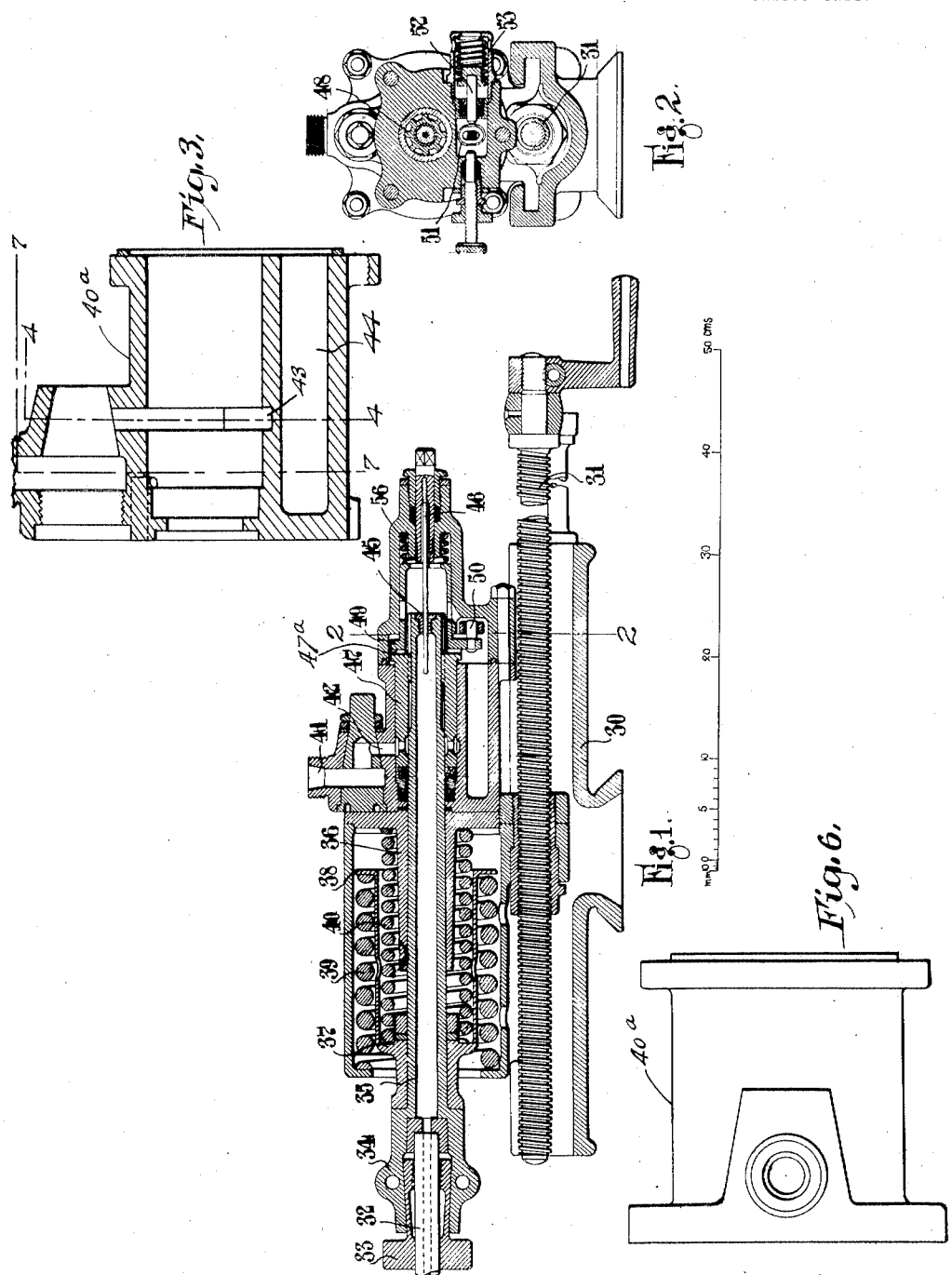

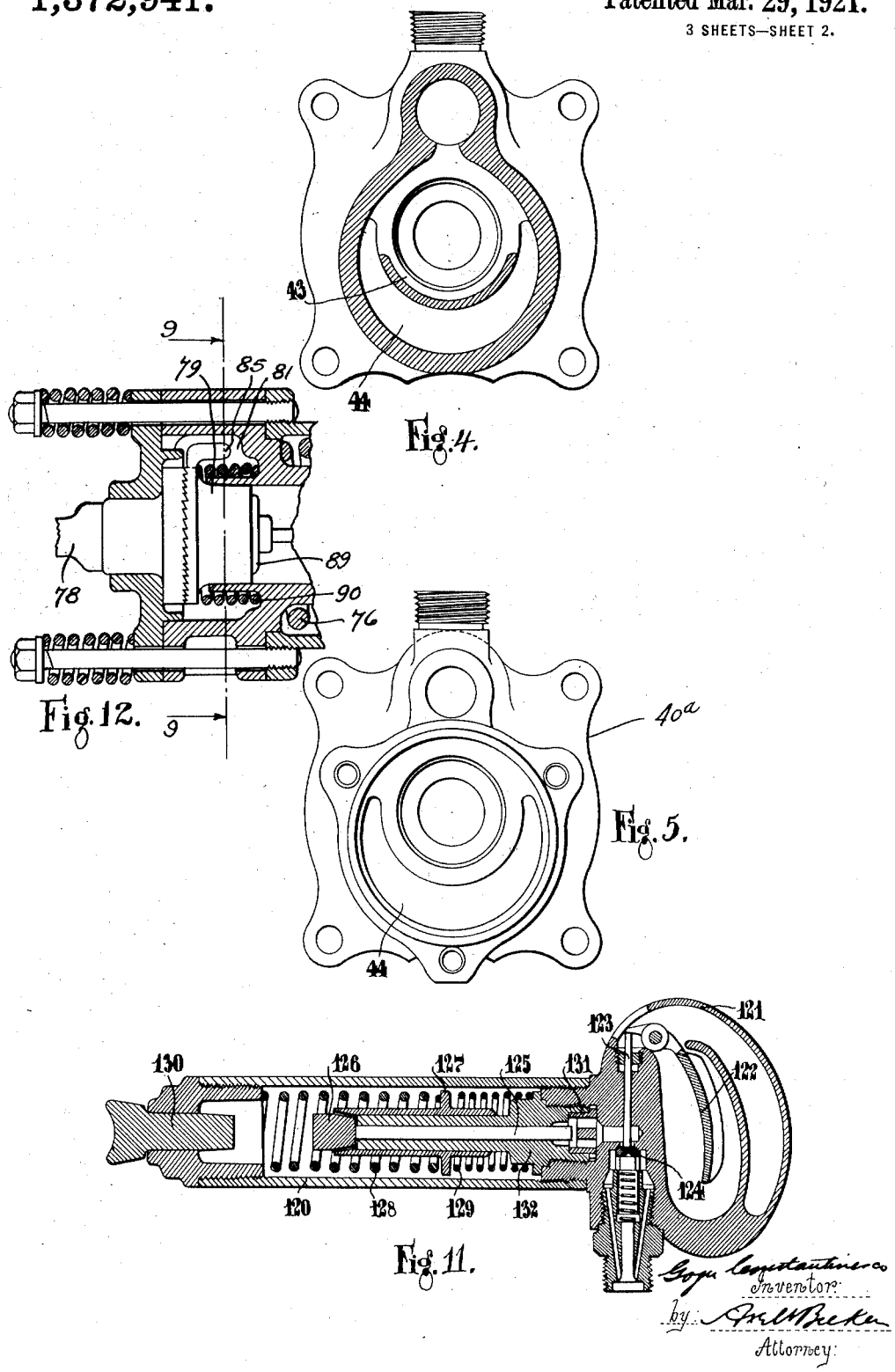

G. CONSTANTINESCO.
POWER DRIVEN RECIPROCATING IMPLEMENT AND MEANS FOR DRIVING THE SAME.
APPLICATION FILED APR. 27, 1917.
1,372,941.
Patented Mar. 29, 1921.
3 SHEETS—SHEET 3.
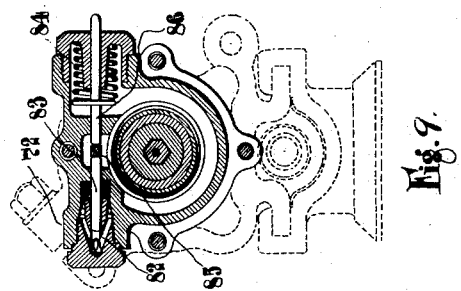
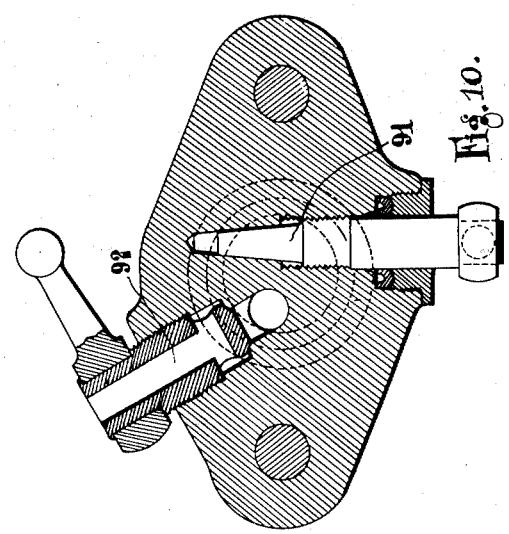
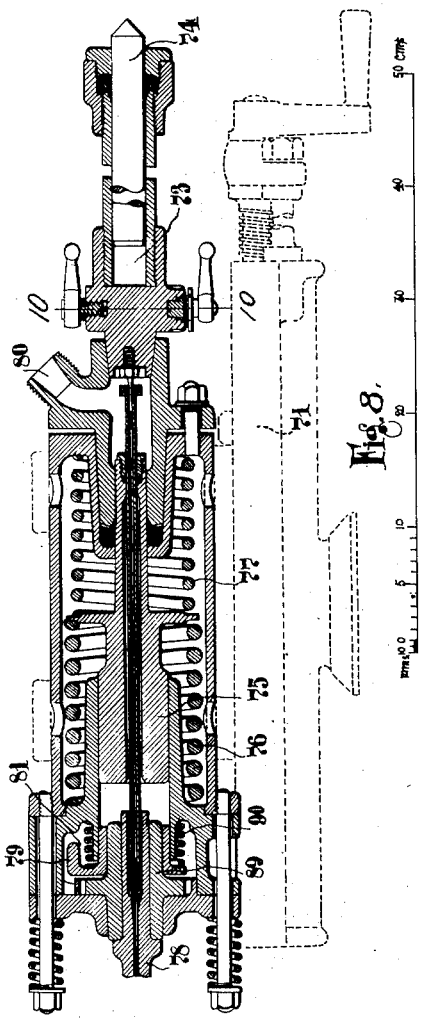
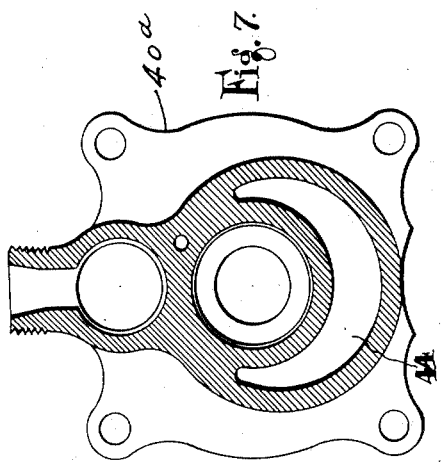

UNITED STATES PATENT OFFICE.

GEORGE CONSTANTINESCO, OF WEYBRIDGE, ENGLAND, ASSIGNOR OF ONE-HALF TO WALTER HADDON, OF LONDON, ENGLAND.

POWER-DRIVEN RECIPROCATING IMPLEMENT AND MEANS FOR DRIVING THE SAME.

1,372,941.      Specification of Letters Patent.    Patented Mar. 29, 1921.

Application filed April 27, 1917. Serial No. 164,909.

*To all whom it may concern:*

Be it known that I, GEORGE (known also as GOGU) CONSTANTINESCO, a subject of the King of Great Britain and Ireland, (formerly a subject of King of Roumania,) residing at "Carmen Sylva," Beechwood avenue, Oatlands Park, Weybridge, in the county of Surrey, England, (formerly residing at the Haddon Engineering Works, Honeypot Lane, Alperton, Middlesex, England,) have invented certain new and useful Improvements in Power-Driven Reciprocating Implements and Means for Driving the Same, of which the following is a specification.

The present invention relates to power driven reciprocating implements and means for driving the same and is especially directed to constructions of implements to be driven by alternating fluid currents produced in liquid columns.

The invention is particularly applicable to implements driven by liquid wave transmission systems of the type described in our British Letters Patent Nos. 9029 of 1913 and 12438 of 1914.

In the specification No. 12438 of 1914 there are described a number of forms of condensers and resonators consisting of masses held in a mean position by springs and actuated by two wave transmission lines, and in the British specification No. 4350 of 1915 reciprocating implements are described which are operated by a single wave transmission line.

The simplest method of obtaining reciprocating motion in this manner is to allow the piston to act against the spring or a capacity comprising a volume of water or other liquid in order to obtain the required stroke.

In this simple method, however, and unless special conditions as regards the strength of the springs and the mass of the reciprocating part are observed, only a portion of the available power can be obtained in work done by the tool, and the working may in certain cases be unsatisfactory owing to the reflection of the waves from an elastic obstacle.

One condition necessary for obtaining the maximum blow from a reciprocating implement is that the natural time period of the reciprocating part, that is to say, in the case of the hammer, of the piston and hammer supported in a mean position by springs should be equal to the timed period of the oscillations of the liquid in the transmission line operating the tool.

I have found further that in order to produce the maximum blow by means of a percussive tool, the reciprocating part of the tool should strike the obstacle at the position in which the reciprocating part would if at rest be in equilibrium under the action of its springs and the mean pressure in the transmission line supposed to act statically, With a percussive tool arranged in this manner the maximum blow for a given expenditure of power in the line is obtained, but on the other hand there also occurs, owing to the sudden arrest of the reciprocating piston, a considerable deformation of the current in the transmission line unless this is considerably greater than the current actually required to operate the tool.

If a single spring is used this condition is obtained when the blow is struck at the position to which the spring is compressed under the mean pressure in the transmission line. It is desirable that the springs should work only under compression and it is therefore generally necessary to employ two springs, one on each side of the piston.

If we suppose that the mean pressure in the main transmission line is H and $\Omega$ the section of the piston, the spring opposing the mean pressure should be of such strength that when the deformation is equal to the full stroke of the hammer the force exerted by the spring will be equal to $F'$ where $F' = H \Omega$. On the return stroke of the piston the back spring would be fully compressed and the front spring completely released.

When the mean pressure in the line is determined, and the stroke required this relation at once gives the strength of the front spring required for any given section of the piston. The strength of the back spring is given by the condition that there should be resonance between the natural time period of the reciprocating parts and the time period in the transmission line. If the period is about 1,000 per minute the maximum effect will be given when the back spring fully compressed exerts a force $F_2$ given by $F_2 = 0.57 F_1$.

In calculating springs the weight of the reciprocating parts including half the weights of the springs must be such that the natural time period of free oscillation of the system formed by these parts shall be equal to the periodicity in the line.

When these proportions are observed the most powerful blows will be obtained from a hammer with a minimum of weight of reciprocating parts and minimum of current absorbed from the wave transmission line.

The present invention consists in reciprocating implements such as pumps, hammers and the like, consisting of reciprocating parts held in a mean position by means of springs, the proportions being such that the natural time period of the reciprocating parts is equal to the periodicity of the wave transmission line.

The invention further consists in percussive tools adapted to be actuated by alternating fluid currents, the tool comprising a reciprocating piston actuated by the alternating fluid current either carrying or striking against the tool, the tool being so arranged that the blow occurs when the piston is at the point at which it would be in equilibrium under the pressure of the spring or springs and the mean pressure in the wave transmission line.

The invention further consists of a pump, blower or the like comprising a reciprocating piston actuated by the wave transmission line and so arranged that it is in equilibrium under supporting springs and the mean pressure in the wave transmission line at the middle point of its stroke.

The invention further consists in a drill comprising a reciprocating part held by springs and in resonance with the periodicity of the line and rotated by the impulses in the transmission line.

The invention further consists in a riveting hammer or other reciprocating tool in resonance with the line and arranged to operate at optimum amplitude.

The invention also consists in the improvements in power driven reciprocating implements and means for driving the same hereinafter described and illustrated in the accompanying drawings.

Referring to the accompanying drawings:—

Figure 1 is a longitudinal section of a rock drill suitable for operation by alternating fluid currents.

Fig. 2 is a sectional end elevation on the line 2—2 Fig. 1.

Fig. 3 is a detail section of the drill casing as shown in Fig. 1.

Fig. 4 is a sectional elevation on the line 4—4, Fig. 3.

Fig. 5 is an end elevation of the drill casing.

Fig. 6 is a plan of the portion of the casing illustrated at Fig. 3.

Fig. 7 is a sectional elevation on the line 7—7, Fig. 3.

Fig. 8 is a longitudinal section of another form of drill.

Fig. 9 being an end sectional elevation of the same on line 9—9 of Fig. 12.

Fig. 10 is a section on the line 10—10, Fig. 8.

Fig. 11 is a longitudinal section through a riveting hammer according to the invention.

Fig. 12 is an enlarged detail view of the left hand end of Fig. 8 showing more particularly the ratchet mechanism.

Figs. 1–7 show one form of drill according to the invention. The drill casing is mounted in guides in a cradle 30 along which it is fed forward by the feed screw 31. The drill bit 32 is held by a spring collet 33 in the chuck 34 which is formed in one with the piston 35. The piston 35 slides in a bearing 36 in the casing and carries a cup-shaped spring abutment 37 having an outwardly projecting flange 38 so that it forms an abutment for the two springs 39, 40, which are adapted to hold the piston in a mean position about which it can oscillate. The springs are of such strength that the piston is in equilibrium under their action and the mean pressure in the wave transmission line, in the position which it occupies at the moment the blow is struck when drilling.

The wave transmission line is connected to the inlet 41 and the whole of the space behind the piston is filled with liquid which passes through the passage 42 to the annular groove 43 from which it can pass to the whole of the outer space 44 of inlet piece 40ª and so to the back of the piston. The piston is hollow and has at its rear end an aperture 45 which works over a conically shaped needle 46 so that a small leak is allowed through this aperture and so to the interior of the drill, whence it passes down the hollow bit to provide a spray for washing out the boring.

On the outside of the drill piston there is mounted a ratchet piece 47 with internal key ways to fit splines 48 on the end of the piston. The end of the ratchet piece is provided with face teeth adapted to engage with face teeth on the rotor ratchet piece 49 which carries a pin 50 engaging with a Scotch yoke 51, on a piston 52 pressed inward by a spring 53 and subject to the liquid impulses in the wave transmission line. The oscillations of the liquid in the wave transmission line are thus transmitted to the piston 35 to give it a reciprocating movement, and also give an oscillating movement to the rotor ratchet piece, thus intermittently rotating the drill in one direction.

A spring 56 is provided to keep the two ratchet pieces in engagement with each other.

Another form of drill is shown in Figs. 8, 9 and 10 adapted either to be fed forward by a feed screw in a cradle 71, shown in dotted lines, to which the drill casing can be clamped by clamps 72, or to be fed forward automatically by admitting fluid pressure from the line to the cylinder 73, in which case the pressure forces the drill forward by reason of the above-mentioned plunger 74 against a suitably fixed surface.

In this form of drill the reciprocating part comprises a piston 75 held in a mean position by the springs 76, 77. The drill bit 78, however, is not attached to the piston but is so placed at the front of the drill casing that the piston on its forward movement strikes a blow on the end of the ratchet piece which bears against shoulders on the drill bit.

The wave transmission line is connected to the inlet 80 and is also connected to the space 81 from which it passes by the apertures 82 to the rear end of a piston 83 whose other end bears against an arm 85 on the ratchet piece 89. This arm is pressed in the opposite direction by a piston 86 pressed forward by the spring 84. An oscillating movement is thus given to the ratchet piece by the alternating current in the wave transmission line.

Ratchet teeth are provided between the oscillating ratchet piece 79 and the ratchet piece 89, the engagement of these teeth being maintained by the spring 90.

In Fig. 10 there is shown a valve 91 for regulating the flow of liquid from the transmission line to the feed cylinder 73, and a valve 92 for allowing the discharge of water from the feed cylinder when it is required to change the drill, or for any other purpose. In this drill, as in that previously described, the drill piston and bit are made hollow and a supply of water is provided to wash out the boring.

Fig. 11 shows a riveting hammer constructed according to the invention. This hammer comprises a casing 120 on one end of which is provided a handle 121 in which is contained an operating lever 122 acting on a pin 123 by which the valve 124 is opened against its spring, admitting the liquid from the transmission line, or a flexible branch from the line to the tool. The water under pressure so admitted acts on the piston 125 which bears against the striking piece 126. This striking piece is provided with a flange 127 by which it is held normally in a mean position by means of springs 128, 129. The striking piece 126 is reciprocated, striking against the hammer piece 130. A hard steel washer 131 is provided to prevent the piston 125 slipping against the rod 123. In this hammer, and in all tools in which the reciprocating mass is comparatively small and in which the current taken by the implement is small in comparison with the total current in the line, in order to obtain the best effect, the anvil, that is to say, the piece struck by the reciprocating piston, should be in such a position that the blow is struck at the point at which the striking end of the piston would be in equilibrium under the action of its supporting springs and the mean pressure in the wave transmission line.

In this position the maximum effect to the blow is obtained, but on the other hand there is also produced the maximum deformation of the liquid current in the wave transmission line so that an implement taking a large proportion of the total current in the line would be apt to interfere with the proper working of other apparatus taking power from the line.

What I claim is:—

1. A percussive instrument comprising in combination a cylinder, a wave transmission line connected to said cylinder, a piston in said cylinder, springs acting on said piston, a tool adapted to be actuated by said piston at a determined point in its stroke, such determined point being that at which the piston is in equilibrium under the action of the springs and the mean pressure in the wave transmission line, as set forth.

2. A percussive instrument comprising in combination a cylinder, a wave transmission line connected to said cylinder, a piston in said cylinder, springs acting on said piston, the mass of said piston and the elasticity of said springs being such that the natural time period of oscillation of the piston is equal to the periodicity in the wave transmission line, a tool adapted to be actuated by said piston at a determined point in its stroke, such determined point being that at which the piston is in equilibrium under the action of the springs and the mean pressure in the wave transmission line, as set forth.

3. A riveting hammer comprising in combination a cylinder, a wave transmission line connected to said cylinder, a hammer head, a piston adapted to strike against said hammer head, springs acting on said piston, said springs being of such strength that the piston is in contact with the hammer head when the latter is in equilibrium under the action of the springs and the mean pressure in the wave transmission line, as set forth.

In testimony whereof I have signed my name to this specification.

GOGU CONSTANTINESCO.